United States Patent [19]

Steinle et al.

[11] Patent Number: 5,646,394
[45] Date of Patent: Jul. 8, 1997

[54] IMAGING DEVICE WITH BEAM STEERING CAPABILITY

[75] Inventors: Michael J. Steinle, Ft. Collins; Joe A. Eccher, Loveland, both of Colo.

[73] Assignee: Hewlett-Packard Company, Palo Alto, Calif.

[21] Appl. No.: 405,116

[22] Filed: Mar. 16, 1995

[51] Int. Cl.⁶ .................................. H01L 27/00; G01J 1/20
[52] U.S. Cl. .................. 250/208.1; 250/234; 250/201.1; 358/400
[58] Field of Search ........................ 250/234, 235, 250/201.1, 208.1; 358/400, 401, 474, 486, 494, 496, 497, 500, 505, 512, 513

[56] References Cited

U.S. PATENT DOCUMENTS

| | | |
|---|---|---|
| 4,709,144 | 11/1987 | Vincent. |
| 4,806,750 | 2/1989 | Vincent. |
| 4,926,041 | 5/1990 | Boyd. |
| 5,018,808 | 5/1991 | Meyers et al. ............... 350/6.91 |
| 5,019,703 | 5/1991 | Boyd et al.. |
| 5,032,004 | 7/1991 | Steinle. |
| 5,040,872 | 8/1991 | Steinle. |
| 5,044,727 | 9/1991 | Steinle. |
| 5,151,887 | 9/1992 | Miyazaki ........................ 369/44.32 |
| 5,227,620 | 7/1993 | Elder, Jr. et al.. |
| 5,315,111 | 5/1994 | Burns et al. ...................... 250/235 |
| 5,341,174 | 8/1994 | Ando ................................ 250/235 |
| 5,373,437 | 12/1994 | Itoh et al. ........................ 369/44.32 |
| 5,387,789 | 2/1995 | Ota ................................ 250/201.7 |

OTHER PUBLICATIONS

United States Patent Application Serial No. 08/108,409 filed Aug. 18, 1993 for Color Optical Scanner With Image Registration Holding Assembly of Steinle et al.

*Primary Examiner*—Stephone Allen

[57] ABSTRACT

The optical photoelectric imaging apparatus adjusts automatically using closed-loop control before each scan to optimize scanning quality. Various optical components can be moved in order to align a scanned image of an object with the linear photosensor array. The device scans a target of known characteristics to determine what adjustment is needed.

33 Claims, 13 Drawing Sheets

IMAGING DEVICE WITH BEAM STEERING CAPABILITY

BACKGROUND OF THE INVENTION

The present invention relates generally to photoelectric imaging devices and, more particularly, to a photoelectric imaging device that is automatically adjustable in the field to compensate for mis-alignment which may occur in such devices.

Photoelectric imaging devices are used to produce machine-readable data which is representative of the image of an object, e.g. a page of printed text. As used herein, the phrase "photoelectric imaging device" means any device which generates data representative of an imaged object through use of a photosensor array such as a charge coupled device (CCD). Photoelectric imaging devices include devices such as camcorders and digital cameras which instantaneously focus an entire image which is to be captured onto a two dimensional photosensor array. Photoelectric imaging devices also include line-focus systems which image an object by sequentially focusing narrow "scan line" portions of the object onto a linear photosensor array by sweeping a scanning head over the object. Such devices, commonly referred to as optical scanners include computer input devices usually referred to simply as "scanners" as well as facsimile machines and digital copy machines.

In a line-focus system, a light beam from an illuminated line object is imaged by a lens on a linear photosensor array which is positioned remotely from the line object. The linear photosensor array is a single dimension array of photoelements which correspond to small area locations on the line object. These small area locations on the line object are commonly referred to as "picture elements" or "pixels." In response to light from its corresponding pixel location on the line object, each photosensor pixel element in the linear photosensor array (sometimes referred to simply as "pixels") produces a data signal which is representative of the light intensity that it experiences during an immediately preceding interval of time known as a sampling interval. All of the photoelement data signals are received and processed by an appropriate data processing system.

In a color optical scanner, a plurality of spectrally separated imaging beams (typically red, green and blue beams) must be projected onto photosensor arrays. Some color optical scanners employ beam splitter devices for spectrally separating an imaging light beam into color component beams. These separate color component beams are projected onto separate linear photosensor arrays. Other optical scanners project color component images on a single linear array in a series of separate scanning passes.

The construction and operation of color optical scanners employing beam splitter assemblies and photosensor arrays are fully disclosed in the following United States patents: U.S. Pat. No. 4,870,268 of Vincent et al. for COLOR COMBINER AND SEPARATOR AND IMPLEMENTATIONS; U.S. Pat. No. 4,926,041 of Boyd for OPTICAL SCANNER (and corresponding EPO patent application no. 90306876.5 filed Jun. 22, 1990); U.S. Pat. No. 5,019,703 of Boyd et al. for OPTICAL SCANNER WITH MIRROR MOUNTED OCCLUDING APERTURE OR FILTER (and corresponding EPO patent application no. 90312893.2 filed Nov. 27,1990); U.S. Pat. No. 5,032,004 of Steinle for BEAM SPLITTER APPARATUS WITH ADJUSTABLE IMAGE FOCUS AND REGISTRATION (and corresponding EPO patent application no. 91304185.1 filed May 9, 1991); U.S. Pat. No. 5,044,727 of Steinle for BEAM SPLITTER/COMBINER APPARATUS (and corresponding EPO patent application no. 91303860.3 filed Apr. 29, 1991); U.S. Pat. No. 5,040,872 of Steinle for BEAM SPLITTER/ COMBINER WITH PATH LENGTH COMPENSATOR (and corresponding EPO patent application no. 90124279.2 filed Dec. 14, 1990 which has been abandoned); U.S. Pat. No. 5,227,620 of Elder, Jr. et al. for APPARATUS FOR ASSEMBLING COMPONENTS OF COLOR OPTICAL SCANNERS (and corresponding EPO patent application no. 91304403.8 file May 16, 1991); and U.S. Pat. No. 5,410,347 of Steinle et al. for COLOR OPTICAL SCANNER WITH IMAGE REGISTRATION HOLDING ASSEMBLY, which are all hereby specifically incorporated by reference for all that is disclosed therein.

In imaging devices and particularly the line-focus system described above, it is imperative for accurate imaging that the light beam from the object be accurately aligned with the photosensor array. In a typical line focus scanning device, before reaching the photosensor array, the imaging light beam is transmitted and/or reflected by several optical components. Even a slight mis-alignment of any of these optical components can cause a serious mis-alignment between the beam and the photosensor array and result in a corresponding degradation in scanning quality. Although the various optical components are precisely aligned upon manufacture of the scanning device, factors such as physical shock and temperature and humidity variations experienced in the field can lead to instability in adhesives and other mechanical parts of the scanning device, thus leading to misalignment.

SUMMARY OF THE INVENTION

The present invention is directed to a method and apparatus which enables automatic adjustments to be made to a photoelectric imaging device in the field to compensate for misalignment of an imaging beam with its photosensor array.

To accomplish this adjustment, the device of the present invention first images a target of known characteristics. A microprocessor then directs that one or more optical components be moved. The component(s) is moved until the microprocessor detects both "edges" of a high intensity portion of the imaging light beam. Having found both edges, the microprocessor then centers the high intensity portion over the photosensor array, thus optimizing its output.

The selected optical components may be rotated or translated to accomplish the beam adjustment. For example, various mirrors in the system may be rotated in order to "steer" the beam, whereas the lens or the photosensor itself might be translated in a non-rotary fashion in order to achieve the desired alignment.

The rotation or translation of the optical components may be achieved by their attachment to any known movement means. Examples of such movement means include piezoelectric crystals, DC motors, stepper motors, and voice coil devices.

The adjustment may be made each time the scanning device is powered-up or at any other interval as needed. The present invention is applicable to mono-chrome, gray scale and color imaging devices and is particularly applicable to line focus imaging devices where accurate beam alignment is critical.

DETAILED DESCRIPTION OF THE INVENTION

Figure 1:
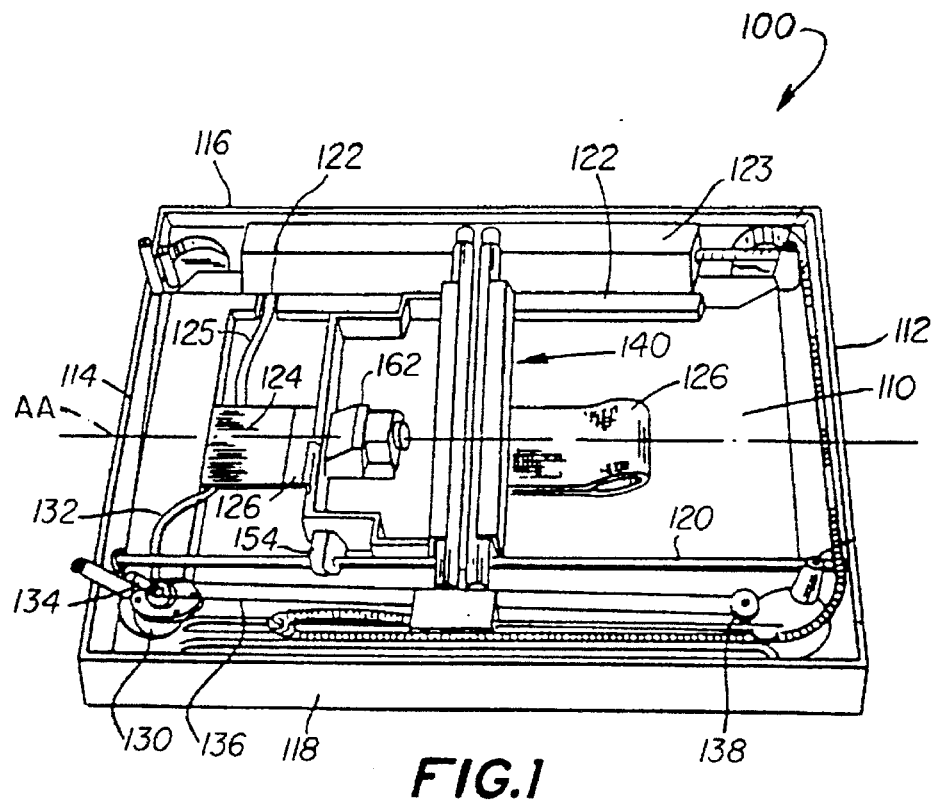
FIG. 1 is a perspective view of an optical scanning device.

FIGS. 1–12, in general, illustrate a photoelectric imaging device 100 for producing machine readable data representative of an imaged object 208. The photoelectric imaging device 100 may include imaging means 188, 212, 214, 216, 164 for enabling transmission of an imaging light beam 210 from a narrow band portion 206 of an object 208 which is scanned and at least one linear photosensor array means 254 for accepting images projected by said imaging light beam 210. The photoelectric imaging device 100 may also include physical adjustment means 300, 302 for selectively adjusting at least a portion of said imaging means 188, 212, 214, 216, 164 in response to data signals generated by said photosensor array means 254 for optimizing performance of the optical scanning device.

Having thus described the photoelectric imaging device 100 in general, the device will now be described in further detail.

FIG. 1 illustrates an optical scanning device 100 of a type adapted to produce machine readable data representative of a color image of an object which is scanned. The machine readable data produced by the optical scanning device is adapted to be received and used by a digital computer in a conventional manner, e.g. the data may be stored on a computer memory device or may be used to produce a color display of the object on a CRT or a color electrostatic print, etc.

As best illustrated in FIG. 1, a longitudinally extending rod 120, is supported at opposite ends thereof by brackets mounted on the front and rear housing walls 112, 114. A longitudinally extending riser 122, may be integrally formed with the bottom wall 110.

As further illustrated in FIG. 1, an electrical power supply unit 123 is fixedly mounted to the lower housing member between sidewall 116 and riser 122. An electronic controller board 124 is fixedly mounted on bottom wall 110 at a rear end portion thereof. The controller board 124 receives power from power supply unit 123 through power cable 125. The controller board is electrically connected with a light processing assembly 162 mounted in a carriage assembly 140 through an electrical cable 126.

A reversible electric motor 130 which receives power through electrical supply cable 132 connected to controller board 124 is fixedly mounted on the bottom wall at a location proximate lateral wall 118 at a rear end portion of the housing member. The reversible electric motor 130 has a vertical motor shaft 134 and is controlled by the controller board. A carriage assembly drive cable 136 has terminal ends thereof wound about vertical motor shaft 134. An intermediate portion of the cable 136 is received about a pulley 138 which is mounted proximate a forward end of the housing.

The scanner carriage assembly 140 is longitudinally displaceably mounted on rod 120 and riser 122. The scanner carriage assembly 140 is attached to cable 136 which produces reciprocal, longitudinal movement thereof.

Figure 2:
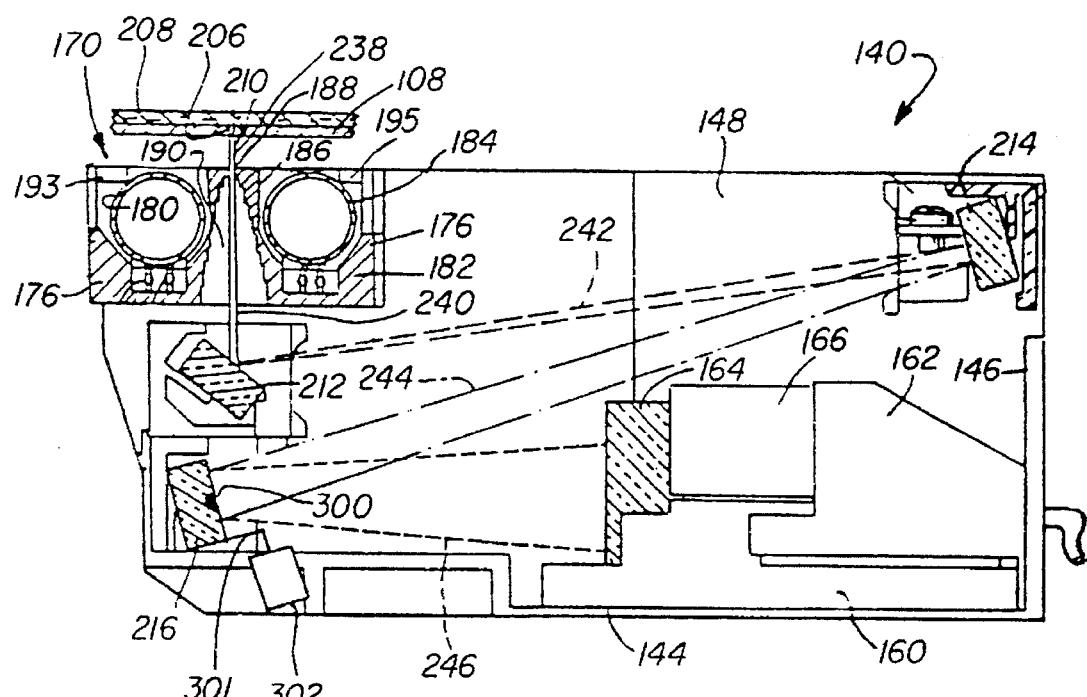
FIG. 2 is a cross-sectional elevation view of an optical scanning carriage assembly incorporating an adjustable mirror.

FIG. 2 shows details of the carriage assembly 140. A centrally mounted support block 160 is fixedly attached to bottom wall 144. A light processing assembly 162 is fixedly attached to support block 160. The light processing assembly 162 may comprise a dual trichromatic beam splitter 250 and photosensor assembly 252, FIG. 3, which may be identical to the type described in U.S. Pat. No. 4,709,144 of Kent D. Vincent for COLOR IMAGER UTILIZING NOVEL TRICHROMATIC BEAMSPLITTER AND PHOTOSENSOR (and corresponding EPO patent no. 024000 issued Feb. 2, 1994) and U.S. Pat. No. 4,806,750 of Kent D. Vincent for COLOR IMAGER UTILIZING NOVEL TRICHROMATIC BEAMSPLITTER AND PHOTOSENSOR which has been abandoned, each of which is hereby specifically incorporated by reference for all that is disclosed therein, and in U.S. Pat. No. 4,870,268 as previously referenced. A lens assembly 164 is adjustably mounted at a position directly forward of light processing assembly 162 by a tubular mounting assembly 166. A modular light source and light slit or aperture assembly 170 is stationarily mounted at a forward location on the carriage body 140. The modular light source and light slit assembly 170 comprises an elongate member 176 having a generally W-shaped cross-section. The elongate member 176 has a forward portion 178 having generally U-shaped cross-section which is adapted for supporting a first fluorescent bulb 180. The elongate member 176 also comprises a rear portion 182 having a generally U-shaped cross-section for supporting a second fluorescent bulb 184. The elongated member 176 has a central riser portion 186. A narrow light slit or aperture 188 is located at the top of riser portion 186 and extends substantially the full length thereof. The light slit 188 opens into a generally inverted V-shaped cavity 190 within the central riser portion 186. The inverted V-shaped cavity 190 also extends substantially the full length of the riser. Shield members 193, 195 may be provided to reflect light from the bulbs 180, 184 toward an object such as color document 208, which is to be scanned.

Light slit 188 passes light reflected from a narrow band region 206 of document 208 and blocks all other light reflected from the document. Document 208 is supported by transparent plate 108. The region 206 from which light is reflected of course changes as scanner carriage assembly 140 moves relative to document 208. However, for purposes of explaining image formation, etc., it is helpful to visualize the scanner carriage assembly 140 and narrow band region 206 in a static position. Narrow band region 206 is sometimes referred to herein as "scan object" 206.

As further illustrated by FIG. 2, some of the light from fluorescent bulbs 180, 184, which is reflected from a narrow band scan region 206 of document 208 and which ultimately enters lens 165 travels along a light path 210 which passes through slit 188 and inverted V-shaped cavity 190. Light path 210 is thereafter "folded" by a first mirror 212, a second mirror 214 and a third mirror 216 before passing through focusing lens 165. Light path 210 thereafter passes through tubular member 166 into light processing assembly 162 and terminates at photosensor assembly 252 therein, FIG. 3.

As best illustrated in FIG. 2, light path 210 comprises a first vertically downwardly extending light path portion 238 extending between scanned document 208 and light slit 188; a second vertically downwardly extending light path portion 240 extending from slit 188 to mirror 212; a third generally rearwardly and upwardly extending light path portion 242 extending between mirror 212 and mirror 214; a fourth generally downwardly and forwardly extending light path portion 244 extending between mirror 214 and mirror 216; and a fifth generally rearwardly extending light path portion 246 extending between mirror 216 and the forward surface of lens 165.

Figure 3:
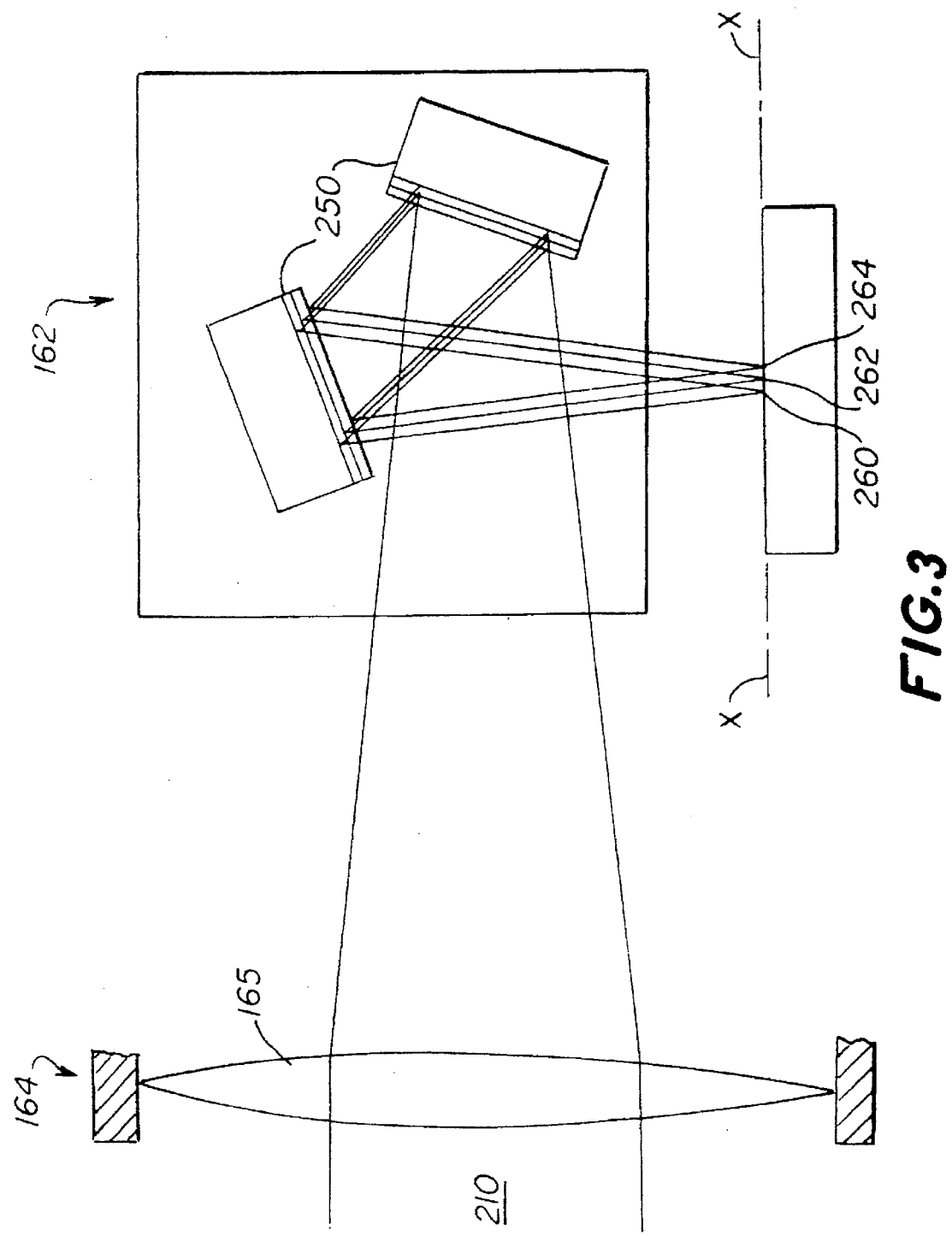
FIG. 3 is a schematic, side elevation view illustrating the operation of a focusing lens, beam splitter assembly, and photosensor assembly.
Figure 4:
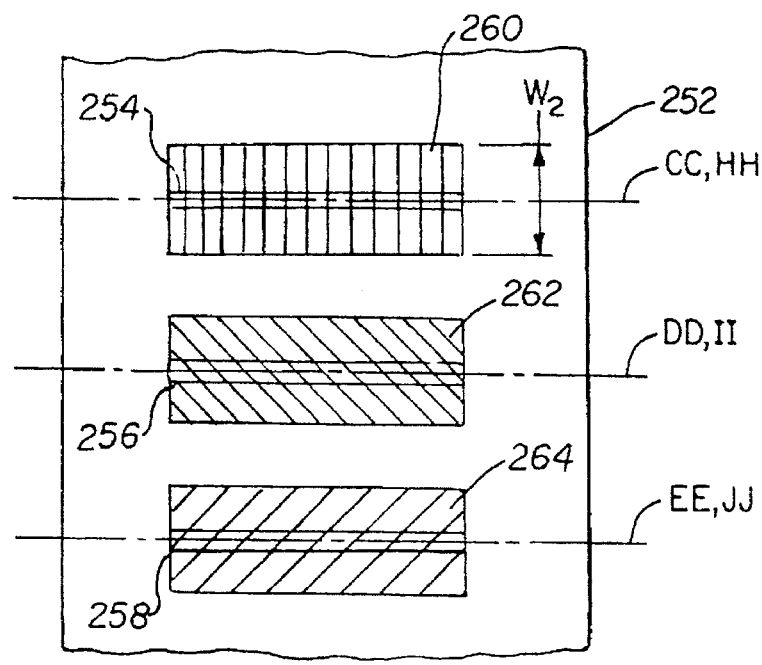
FIGS. 4 and 5 are top plan views of a photosensor assembly with color component images projected thereon.

As illustrated schematically by FIG. 3, light processing assembly 162 may comprise a dual chromatic beam splitter 250 and a photosensor assembly 252 which may be identical to the beam splitter and photosensor array described with reference to FIG. 12 in U.S. Pat. No. 4,870,268 as previously referenced. The photosensor assembly 252 comprises three spaced apart, parallel, linear photosensor arrays 254, 256, 258, FIGS. 4 and 5, having longitudinal axes CC, DD, EE which are located in a common photosensor plane XX. The beam splitter 250 is disposed within light path 210 at the rear of lens 165. The beam splitter 250 bends the composite light beam traveling along light path 210 90° and separates it into parallel red, green, and blue component beams. The photosensor assembly is positioned perpendicular to the paths of the component beams. A red component image 260 of the scan object 206 is projected onto the photosensor assembly 252 in overlying relationship with linear photosensor array 254 as shown in FIG. 4. A green component image 262 of scan object 206 is projected onto the photosensor assembly in overlying relationship with linear photosensor array 256. A blue component image 264 of the scan object 206 is projected onto the photosensor assembly in overlying relationship with linear photosensor array 258.

As illustrated in FIG. 4, the photosensor assembly 252 is located such that the central longitudinal axes CC, DD and EE of the linear photosensor arrays are coaxial with component image centerlines HH, II, JJ, respectively. Each linear photosensor array 254, 256, 258 produces an electronic signal which is interpreted by the scanning device data processing system, as being representative of the color of the particular component image which is designed to overlie that particular linear photosensor array.

Figure 5:
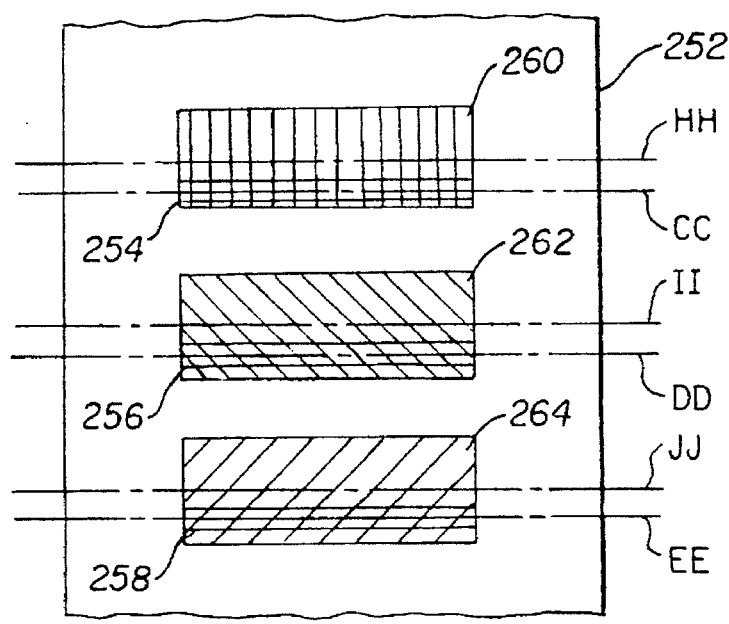

During operation of the scanning device, it is imperative that the component color beams 260, 262, 264 be centered over their respective photosensor arrays 254, 256, 258. This centered condition is shown in FIG. 4. Misalignment of the beams with the photosensors results in degradation of scanning image quality. An example of such a mis-aligned condition is shown in FIG. 5.

Although alignment is generally precisely set when the scanning device is first manufactured, factors such as physical shock and temperature and humidity variations experienced after manufacture may lead to instability in adhesives and other mechanical parts of the scanning device, thus leading to misalignment. The present invention addresses this problem by providing for automatic re-alignment of the scanning device in the field by automatically adjusting portions of the light-transmitting pathway.

Referring now to FIG. 2, it can be seen that mirror 216 has been mounted on a pivot 300 to allow for rotation of the mirror 216 about an axis extending into the page at the point of pivot 300. Actuator arm 301 extends from mirror 216 and pivotally connects with actuator 302.

Actuator 302 is shown schematically and could comprise any known type of actuating device. Actuator 302 might, for example, be a piezoelectric crystal device, a DC motor, a stepper motor or a voice coil device.

Figure 6:
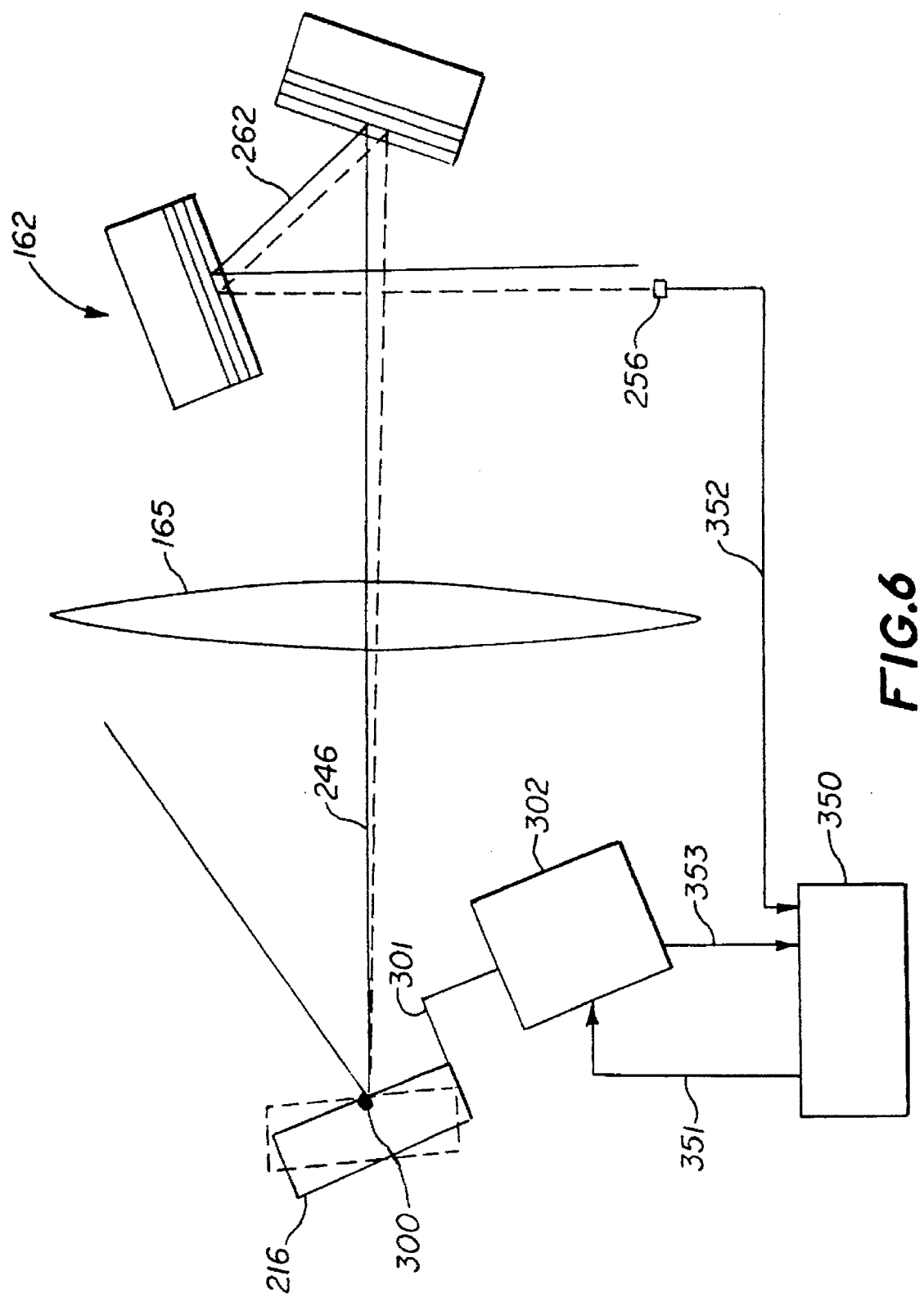
FIG. 6 is a schematic, side elevation view illustrating the operation of an adjustable mirror.

In operation, actuator 302 applies a force to the end of actuator arm 301, thus causing rotation of mirror 216 about the axis 300. FIG. 6 schematically shows the effect that rotating mirror 216 has on the light path portion 246 and the resulting color component beams 260, 262, 264. For the sake of clarity, only the green color component beam 262 is shown in FIG. 6. For the sake of simplicity, reference may occasionally be made herein to adjusting or moving only one of the color component beams. It should be understood, however, that the component color beams 260, 262, 264 always move together. As can be seen from FIG. 6, rotation of mirror 216 in a clockwise direction (from the solid line position to the broken line position indicated) results in the light path portion 246 being shifted downwardly to the dotted line position through lens 165 before entering light processing assembly 162. As shown, this results in a shift from right to left of the color component beam 262, causing it to align with linear photosensor array 256. It is noted that the movement of mirror 216 and of the light paths in FIG. 6 has been greatly exaggerated for purposes of illustration.

Figure 7:
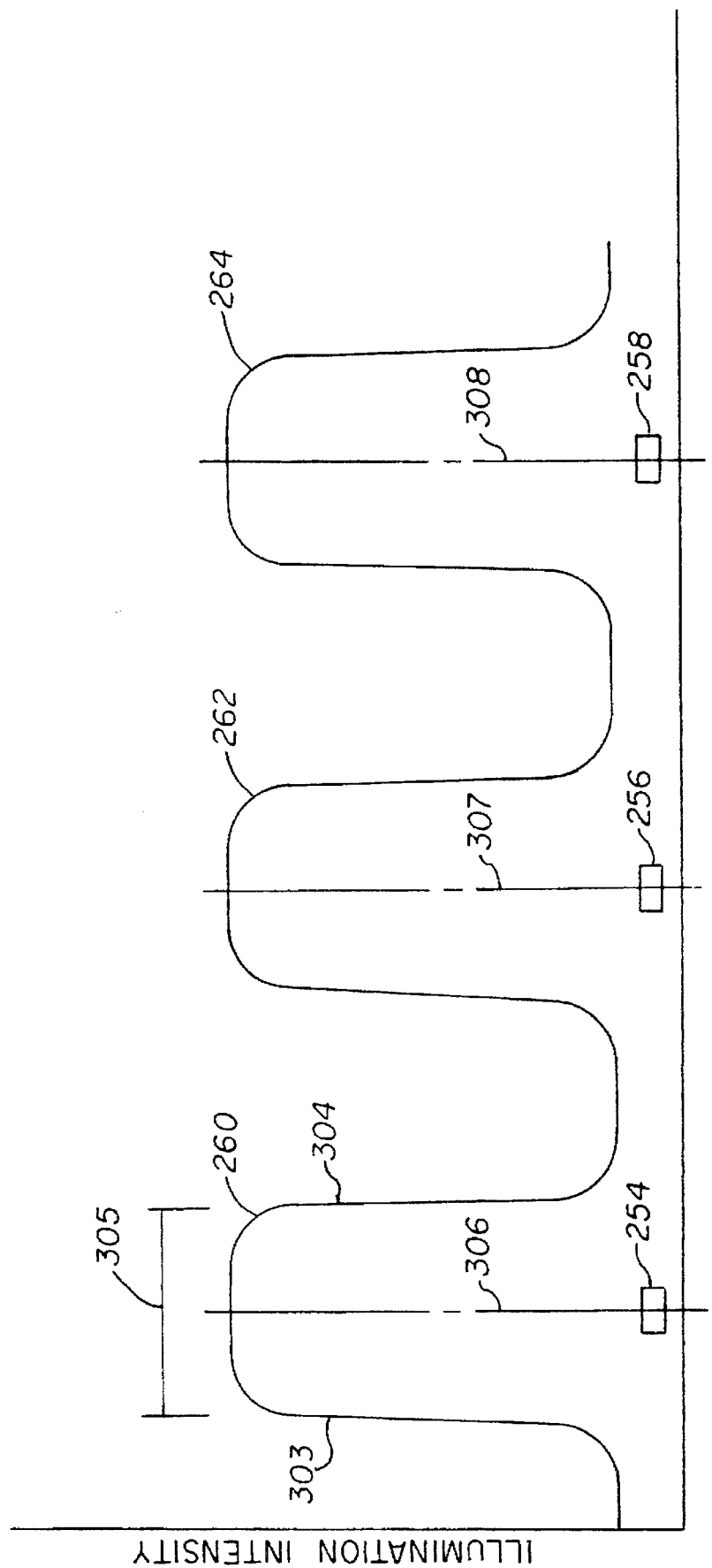
FIG. 7 is a graphical representation of the illumination intensity of color component images on a photosensor assembly.

FIG. 7 is a graphical representation of the relationship between illumination intensity of the color component beams 260, 262, 264 and distance measured in the plane of the linear photosensor arrays 254, 256, 258. FIG. 7 depicts the ideal situation in which the center 306, 307, 308 of each color component beam 260, 262, 264 is aligned over its respective photosensor array 254, 256, 258.

As can be seen from FIG. 7, the profile of the illumination intensity includes a relatively level area 305 of high illumination intensity. The scanning device will function so long as the photosensor arrays 254, 256, 258 lie within these high intensity areas. For optimum scanning quality, however, the high intensity areas must be centered over the photosensor arrays 254, 256, 258 as shown in FIG. 7. If the high intensity areas are not so centered (as shown in FIG. 5), then scanning flaws such as ghosting will result. It is therefore an object of the present invention to enable centering of the high intensity areas with respect to their corresponding photosensor arrays.

Because there is no distinct peak in intensity at the center 306 of the high intensity area, the location of this center is difficult to detect. The present invention overcomes this difficulty by first finding the edges 303, 304 of the high intensity area of color component beam 260. The location of the center 306 is then found by calculating half the distance between the edges 303 and 304.

During operation, a microprocessor 350, FIG. 6, which may be located on electronic controller board 124, first causes carriage 140 to move to a position in which it is viewing a predetermined target of known characteristics.

This target may be permanently mounted in any convenient location on the scanning device. In a preferred embodiment of the invention, however, the target is mounted on transparent plate 108 at a location outside of the normal scanning area.

The edges 303, 304 of the high illumination intensity area are defined as points where the illumination intensity is equal to a certain percentage of the maximum illumination intensity which is experienced over level area 305. The edges may, for example, be defined as points where the illumination intensity is equal to about 80% of the maximum illumination intensity.

This maximum illumination intensity is known since a predetermined target is being scanned by the scanning device while the adjustment is being made. Illumination intensity is measured by monitoring the photosensor output signal strength which is proportional to the illumination intensity.

A displacement signal 351 (FIG. 6) is then sent by microprocessor 350 to actuator 302 causing it to move mirror 216 until the signal 352 emitted by the photosensor array 256 equals the preset edge value signal as described above.

Figure 13:
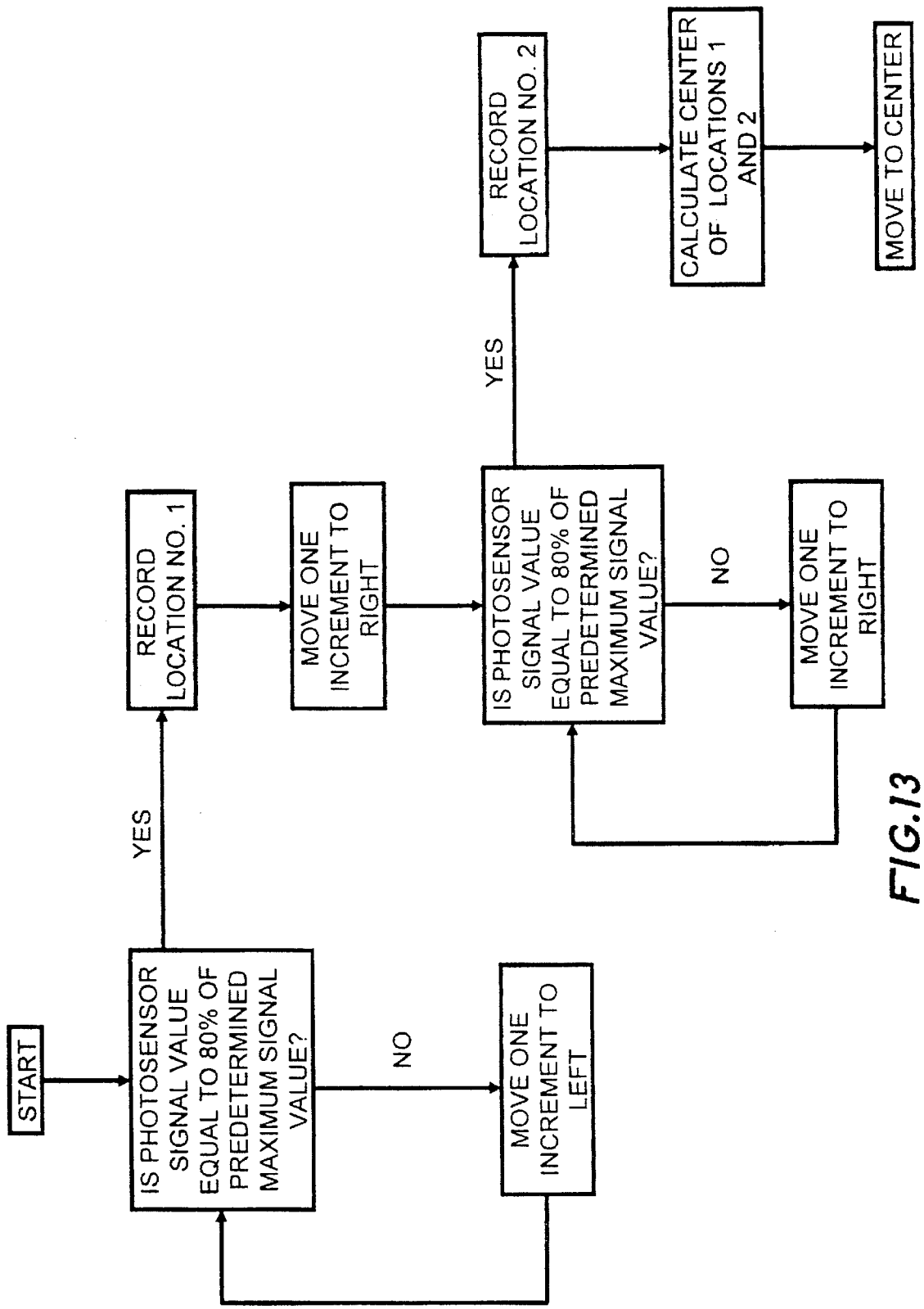
FIG. 13 is a block diagram showing steps for adjusting a photoelectric imaging device.

When this preset edge value signal is detected, microprocessor 350 records the position signal 353 from actuator 302. The actuator is then signalled by microprocessor 350 to move in the opposite direction until the other edge is located in a similar manner. Knowing the position of both edges, the microprocessor can then calculate the center and send a signal to actuator 302 causing mirror 216 to move to this center position and thus optimize the scanning device output. This procedure for finding the center of the high intensity area is illustrated in FIG. 13.

The above procedure will function adequately so long as the photosensor 254 is initially located somewhere within high illumination intensity area 305. If it is found that severe misalignment, in which photosensor 254 is not located within area 305, is a problem, then the following alternative embodiment of the present invention may be employed.

After aligning with the target as previously described, the microprocessor may move the color component beam 260 to a physical location that is completely to one side of the photosensor array 254 by moving mirror 216. The microprocessor then moves the color component beam 260 toward photosensor array 254 until the first edge, as defined above, is located. The microprocessor then moves the beam further in the same direction until the second edge is located. Knowing the location of both edges, the microprocessor can then calculate the center and send a signal to actuator 302 causing mirror 216 to move to this center position and thus optimize the scanning device output.

In this manner, the scanning device can be precisely aligned, thus optimizing scanning quality. Although the above descriptions of operation are described with respect to color scanning devices, this alignment capability could easily be applied to mono-chrome scanning devices in which no color light separating mechanism is employed. The scanning device has thus far been described with respect to moving mirror 216 to accomplish alignment. Any of the mirrors in the system, however, could alternatively or additionally be fitted with a pivot and an actuator to accomplish the same result, using the procedure described above.

The procedure described above may be initiated at any convenient time. In a preferred embodiment, however, the alignment procedure is initiated each time the scanning device is powered up and before each scan.

Components other than mirrors may also be adjusted to accomplish alignment employing the procedure described above, as illustrated by the following description of alternative embodiments.

Figure 8:
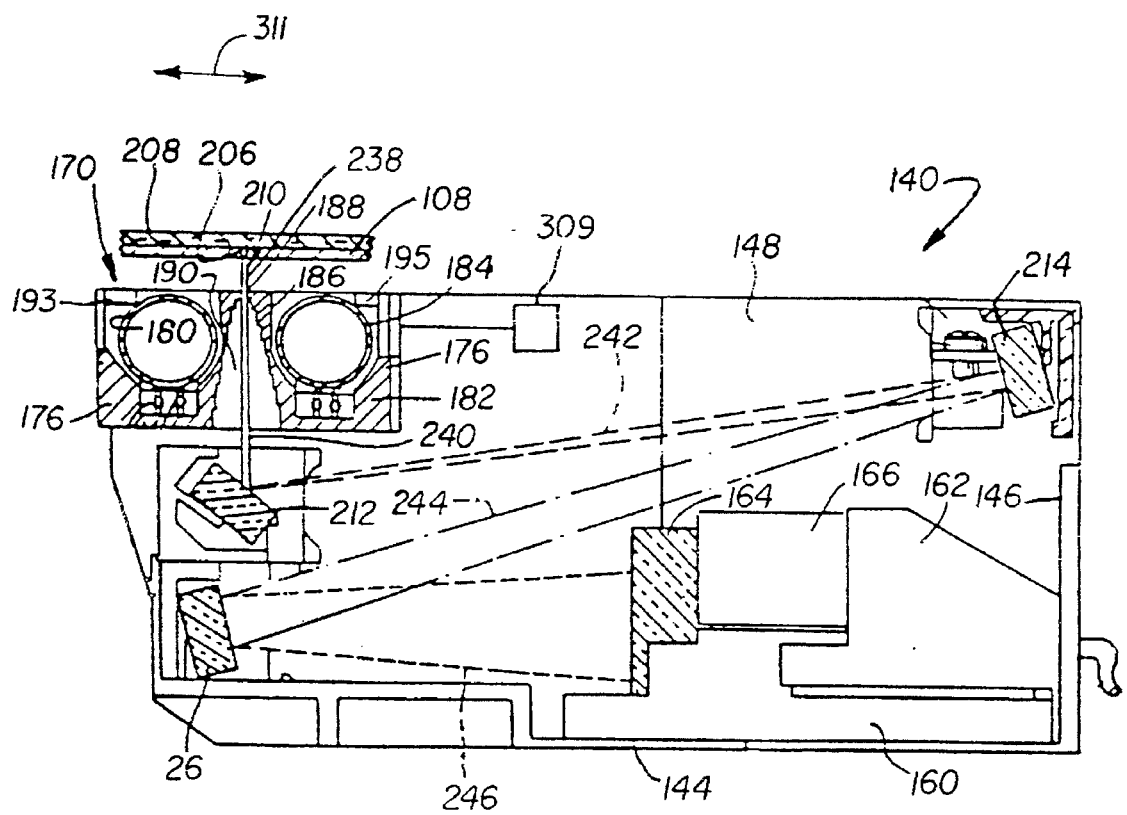
FIG. 8 is a cross-sectional elevation view illustrating an alternative embodiment of an optical scanning device incorporating a movable slit assembly.

FIG. 8 schematically shows an alternative embodiment of the invention in which an actuator 309 is connected to slit assembly 170. Slit assembly 170 is mounted on a slide mechanism (not shown) which allows movement of the slit assembly 170 in the directions indicated by the arrow 311. Actuation of the actuator 309 thus causes slit assembly 170 to move as shown. Movement of the slit assembly 170 in this manner causes the light path portion 238 to move in the same direction thus resulting in a relative movement between the color component beams 260, 262, 264 and photosensor arrays 254, 256, 258.

Figure 9:
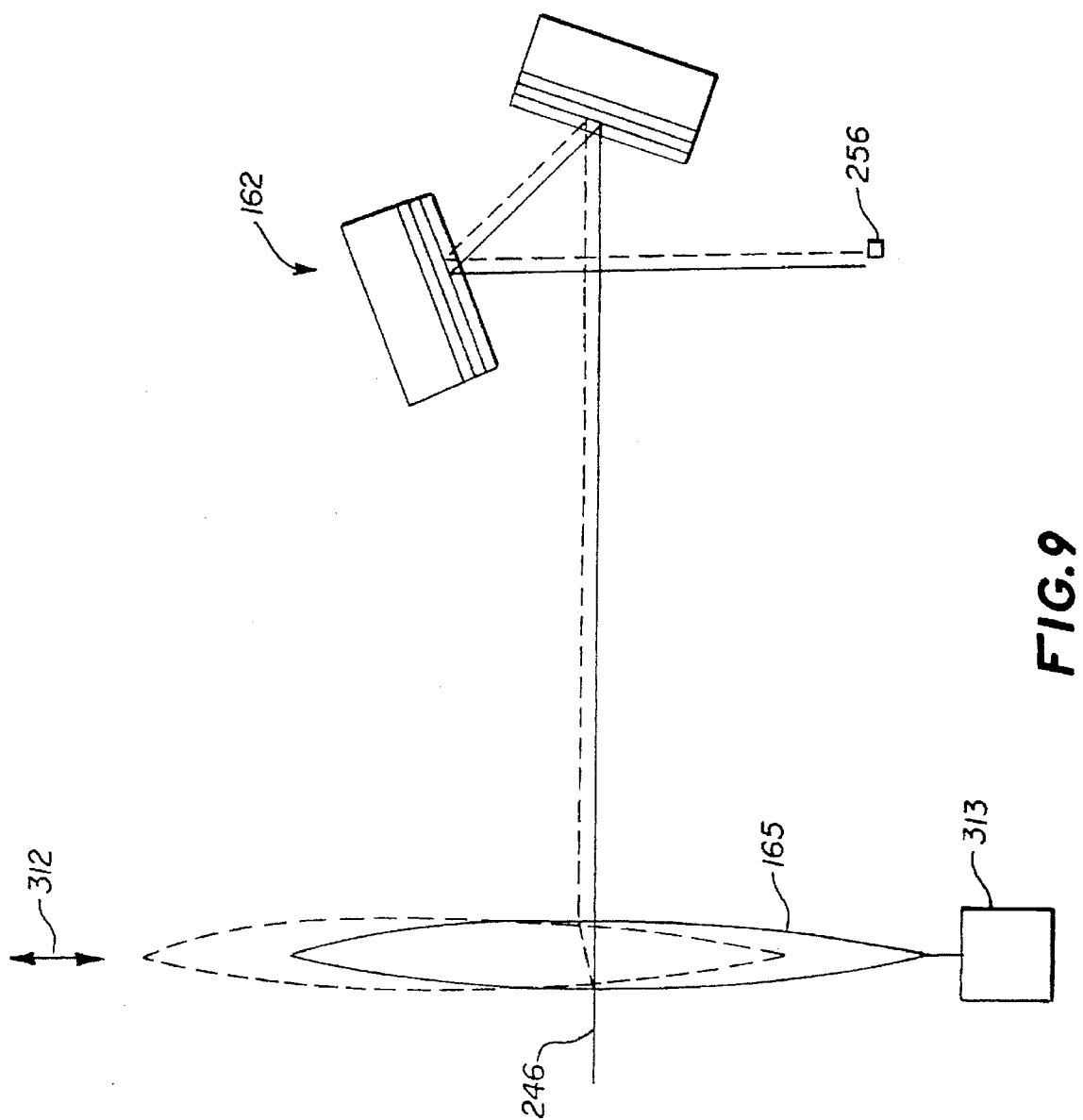
FIG. 9 is a schematic, side elevation view illustrating an alternative embodiment of an optical scanning device incorporating a movable lens assembly.

FIG. 9 schematically shows another alternative embodiment of the invention in which the lens 165 is mounted to allow movement in directions as shown by the arrow 312. An actuator 313 is connected to lens 165. Actuation of actuator 313, thus, results in movement of lens 165 as shown. Moving lens 165 from the position illustrated by solid lines to the position indicated by broken lines in FIG. 9 results in movement of light path portion 246 from the solid line position to the broken-line position and thus causes a relative movement between the color component beams 260, 262, 264 and photosensor arrays 254, 256, 258.

Figure 10:
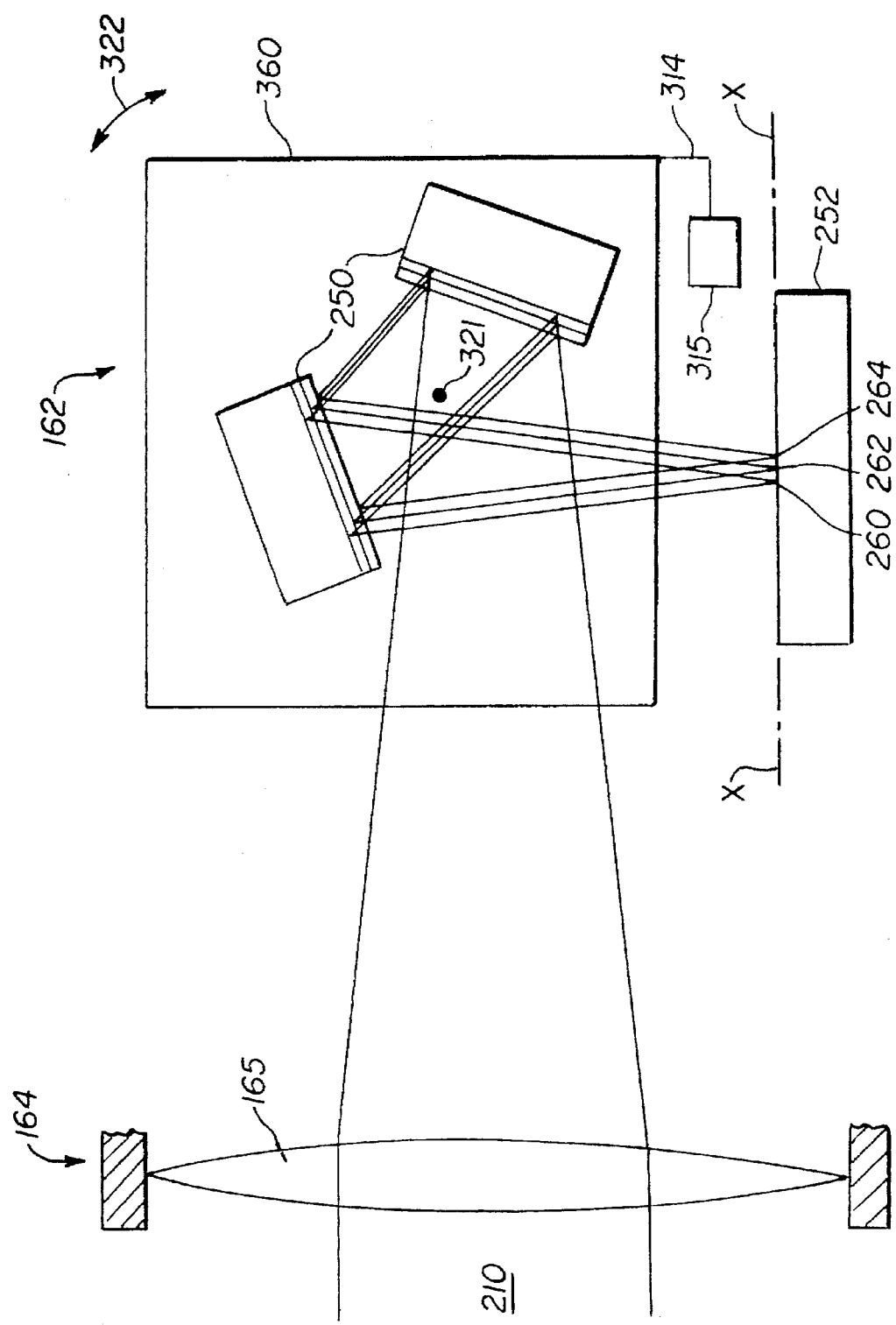
FIG. 10 is a schematic, side elevation view illustrating an alternative embodiment of an optical scanning device incorporating a movable beam splitter assembly.

In another alternative embodiment of the invention, the light processing assembly 162 is rotated in order to align the color component beams 260, 262, 264 with the photosensor arrays 254, 256, 258. As schematically shown in FIG. 10, light processing assembly 162 is mounted on a pivot 321. An actuator arm 314 is rigidly attached to the light processing assembly 162 and pivotally attached to an actuator 315. Actuation of the actuator 315 thus results in rotational movement of beam splitter assembly 360 in the directions shown by arrow 322 and causes relative movement between the color component beams 260, 262, 264 and the photosensor arrays 254, 256, 258 in order to accomplish alignment.

Figure 11:
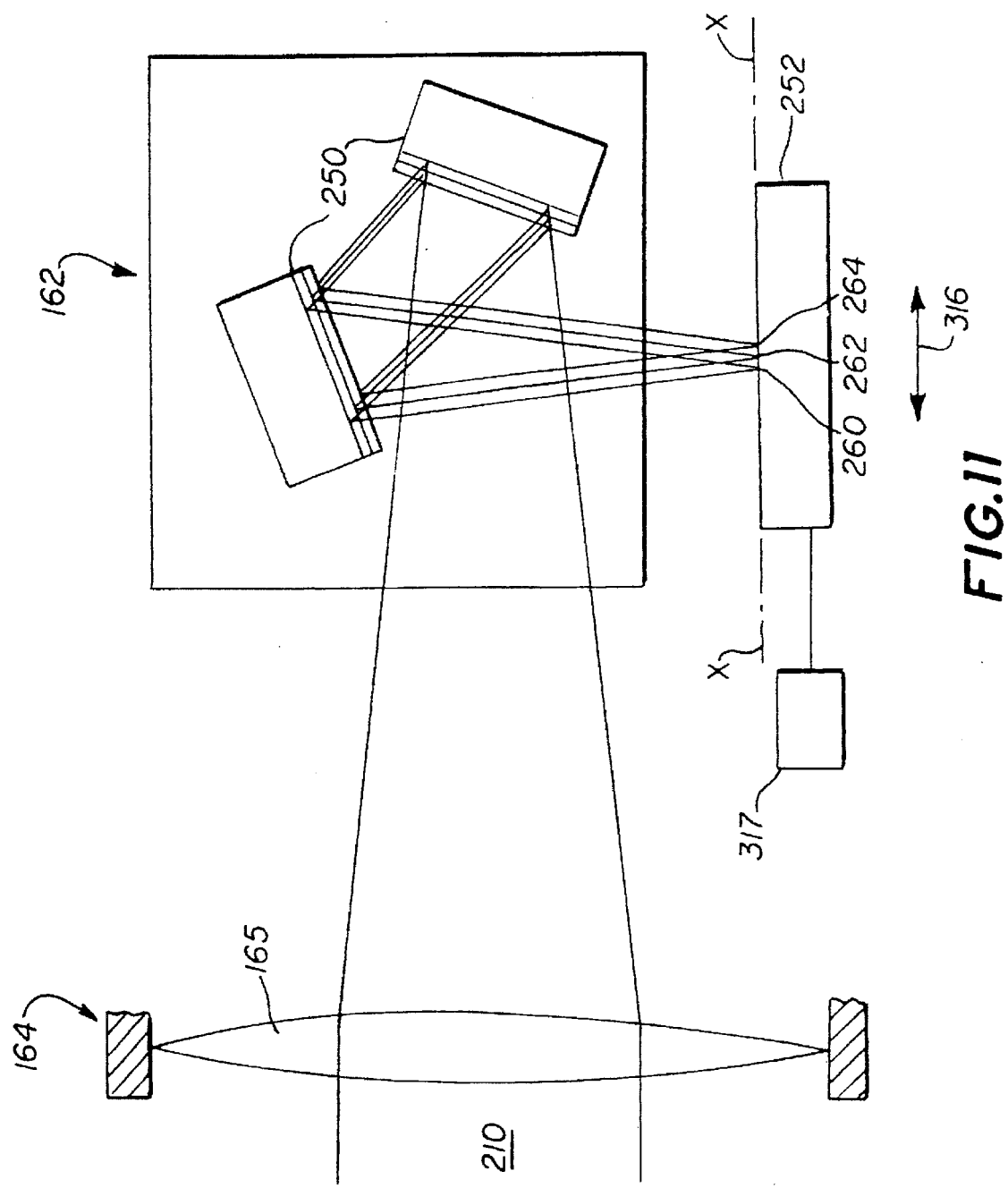
FIG. 11 is a schematic, side elevation view illustrating an alternative embodiment of an optical scanning device incorporating a movable photosensor assembly.

FIG. 11 schematically depicts another alternative embodiment of the invention in which the photosensor assembly 252 is translated in the directions shown by arrow 316 to achieve relative movement between the color component beams 260, 262, 264 and the photosensors arrays 254, 256, 258 in order to accomplish alignment. Photosensor assembly 252 is mounted to allow for translational movement in the directions shown by arrow 316. Actuator 317 is connected to photosensor assembly 252. Actuation of the actuator 317 thus results in translational movement of the photosensor assembly 252 as shown to accomplish alignment.

Figure 12:
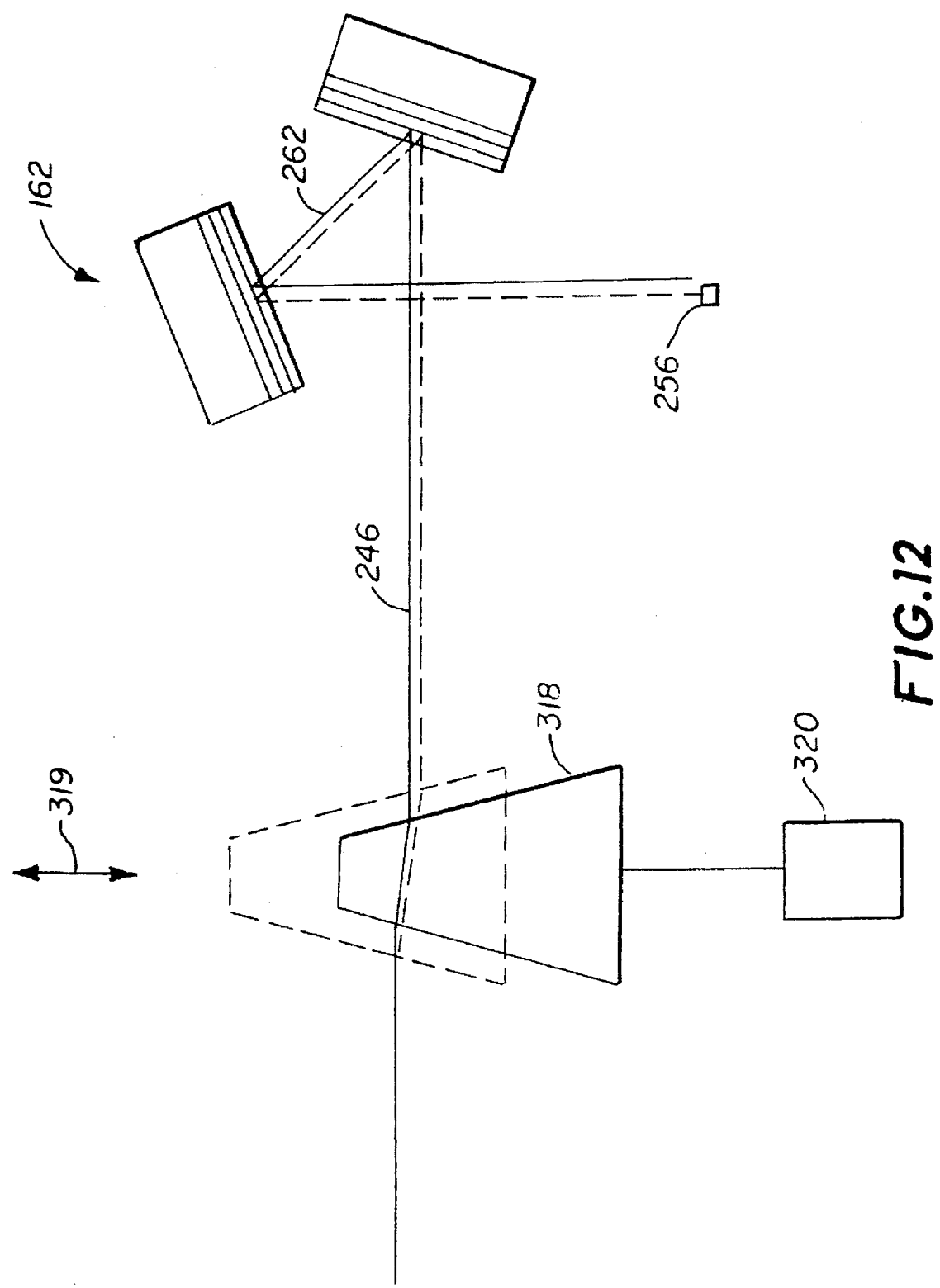
FIG. 12 is a schematic, side elevation view illustrating an alternative embodiment of an optical scanning device incorporating a movable wedge assembly.

FIG. 12 schematically depicts another alternative embodiment of the invention. A translucent wedge, which may be glass, is mounted so as to allow movement in the directions shown by arrow 319. Actuator 320 is connected to wedge 318. Actuation of actuator 320, thus, causes wedge 318 to move in the directions indicated by arrow 319. Wedge 318 refracts light path portion 246 as shown. Moving wedge 318 further into light path 246, as shown by the broken line version, causes color component beam 262 to move from right to left as shown by the broken lines. Moving wedge 318 in the opposite direction would, of course, cause color component beam 262 to move opposite direction, i.e. from left to right. This causes relative movement between the color component beams 260, 262, 264 and the photosensors arrays 254, 256, 258 in order to accomplish alignment.

Figure 14:
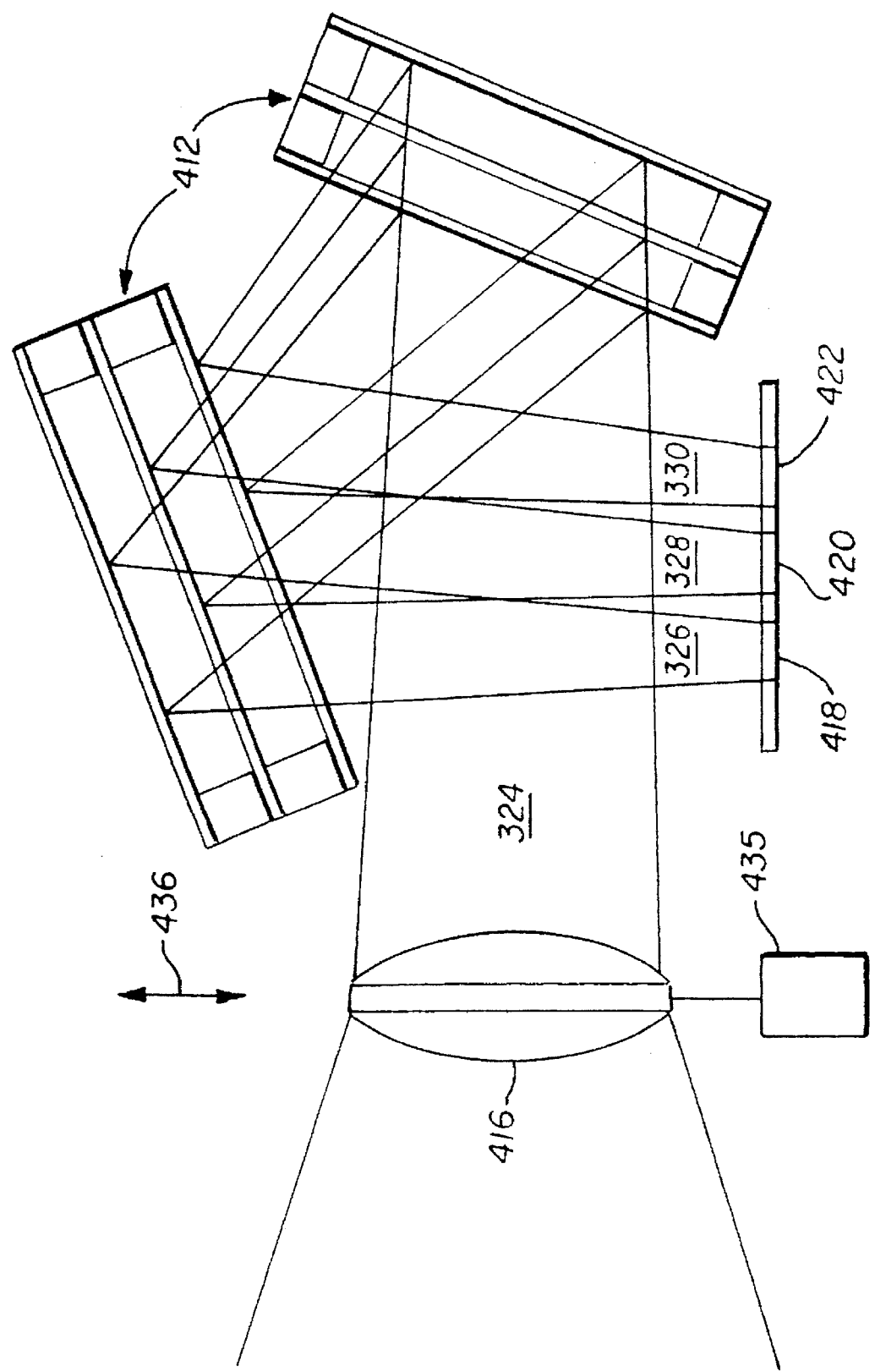
FIG. 14 is a schematic, side elevation view illustrating an alternative embodiment of an optical scanning device used with an area photosensor array.
Figure 15:
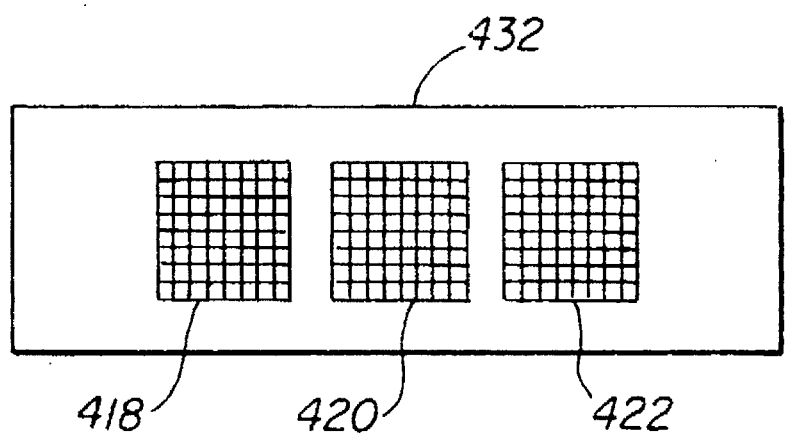
FIG. 15 is a top plan view of the area photosensor arrays of FIG. 14.

FIGS. 14 and 15 schematically illustrate how the alignment mechanism described may be used in conjunction with a photoelectric imaging device employing two dimensional photosensor arrays such as a camcorder or digital camera. These devices may use a dual trichromatic beam splitter 412 in a manner similar to the line scan devices previously described to separate an imaging beam 324 into color component beams 326, 328 and 330. In the case of a two-dimensional array photoelectric imaging device, however, the imaging beam 324 and color component beams 326, 328 and 330 are two-dimensional images rather than one-dimensional line images.

Imaging light beam 324 is projected through a lens 416 and into a tri-chromatic beam splitter 412 which separates light beam 324 into color component beams 326, 328 and 330. The color component beams are then focused upon the two dimensional photoelectric arrays 418, 420, 422 which are located on two dimensional photoelectric assembly 432, FIG. 15.

An actuator 435 is connected to the lens 416 providing for movement of the lens in the directions indicated by the arrow 436. Movement of the lens in this manner results in steering of light beam 324 and the resulting color component beams 326, 328 and 330 to align the color component beams with their respective arrays 418, 420 and 422 as described previously with respect to the embodiment of FIG. 9.

Although the two-dimensional array alignment system of FIG. 14 has been described with respect to moving the lens 416, any of the optical components previously described could alternatively or additionally be used to achieve alignment in a two-dimensional array system. Also, an additional actuator could be provided to move the lens, or other component, in the second dimension to achieve two-dimensional alignment in a two-dimensional photoelectric array device.

In each of the alternative embodiments described above, the referenced actuator is controlled by a microprocessor in a manner identical to that previously described with respect to microprocessor 350, movable mirror 216 and the corresponding actuator 302 to optimize the output of the scanning device.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A photoelectric imaging apparatus for producing machine-readable data representative of imaged objects comprising:
   (a) a photosensor array;
   (b) imaging means for directing a beam of light from an imaged object onto said photosensor array;
   (c) physical adjustment means for aligning said beam with said photosensor array by selectively causing relative movement between at least a portion of said imaging means and said photosensor array in response to data signals generated by said photosensor array.

2. Apparatus as in claim 1 wherein said imaging means comprises a mirror and said adjustment means comprises means for spatially displacing said mirror relative to said photosensor array.

3. Apparatus as in claim 1 wherein said imaging means comprises a narrow width, elongate light slit means and said adjustment means comprises means for spatially displacing said slit means relative to said photosensor array.

4. Apparatus as in claim 1 wherein said imaging means comprises a lens portion and said adjustment means comprises means for spatially displacing said lens portion relative to said photosensor array.

5. Apparatus as in claim 1 wherein said imaging means comprises a filter section for producing spatially separated color component images of said imaging light beam and said adjustment means comprises means for spatially displacing said filter section relative to said photosensor array.

6. Apparatus as in claim 1 wherein said imaging means comprises a translucent wedge means and said adjustment means comprises means for spatially displacing said wedge means relative to said photosensor array.

7. Apparatus as in claim 1 wherein said adjustment means comprises means for spatially displacing said photosensor array.

8. Apparatus as in claim 1 wherein said adjustment means comprises piezoelectric means.

9. Apparatus as in claim 1 wherein said adjustment means comprises a stepper motor.

10. Apparatus as in claim 1 wherein said adjustment means comprises voice coil means.

11. A method for optimizing the alignment of a beam of light with a photosensor array in a photoelectric imaging apparatus which includes said photosensor array and an imaging subassembly which directs said beam of light from an image of at least a portion of an object which is scanned onto the photosensor array comprising:
   generating a photosensor data signal representative of an image which is projected onto the photosensor array and
   aligning said beam of light with said photosensor array by causing relative movement between at least a portion of said imaging subassembly and said photosensor array in response to the photosensor data signal.

12. A method for optimizing the alignment of an imaging light beam with a photosensor array in a photoelectric imaging apparatus comprising an imaging subassembly and said photosensor array, both mounted on a carriage assembly, comprising the steps of:
   (a) positioning said carriage assembly adjacent a target;
   (b) transmitting said imaging light beam from said target through said imaging subassembly to said photosensor array;
   (c) generating signals from said photosensor array in response to said imaging light beam; and
   (d) causing relative movement between at least a portion of said imaging subassembly and said photosensor array to optimize the alignment of said imaging light beam with said photosensor array.

13. A method as in claim 12 wherein a maximum signal strength generated by said photosensor array when said target is being scanned is known and wherein said step of causing relative movement further comprises:
   (a) moving said at least a portion of said imaging subassembly in a first direction to a first position where the signal generated by said photosensor array is equal to a predetermined percentage of said maximum signal strength;
   (b) moving said at least a portion of said imaging subassembly in a direction opposite to said first direction to a second position where the signal generated by said photosensor array is equal to said predetermined percentage of said maximum signal strength;

(c) calculating the midpoint between said first position and said second position; and (d) moving said at least a portion of said imaging subassembly to said midpoint.

14. The method of claim 13 wherein said predetermined percentage is about 80 percent.

15. A method as in claim 12 wherein a maximum signal strength generated by said photosensor array when said target is being scanned is known and wherein said step of causing relative movement further comprises:

(a) moving said at least a portion of said imaging subassembly in a first direction to a first position where the signal generated by said photosensor array is equal to a predetermined percentage of said maximum signal strength;

(b) moving said at least a portion of said imaging subassembly in said first direction to a second position where the signal generated by said photosensor array is equal to said predetermined percentage of said maximum signal strength;

(c) calculating the midpoint between said first position and said second position; and (d) moving said at least a portion of said imaging subassembly to said midpoint.

16. The method of claim 15 wherein said predetermined percentage is about 80 percent.

17. A photoelectric imaging apparatus for producing machine-readable data representative of imaged objects comprising:

(a) a photosensor assembly;

(b) at least one optical component located within a light path extending between an object which is to be imaged and said photosensor assembly, wherein said at least one optical component is transversely moveable with respect to a portion of said light path located immediately adjacent said at least one optical component and extending toward said photosensor assembly;

(c) an optical component displacement device mechanically connected to said at least one optical component; and (d) a signal processor assembly having a signal input portion connected to said photosensor assembly and having a signal output portion connected to said optical component displacement device.

18. Apparatus as in claim 17 wherein said at least one optical component comprises a narrow width, elongate light slit apparatus and said optical component displacement device is mechanically connected to said narrow width, elongate light slit apparatus.

19. Apparatus as in claim 17 wherein said at least one optical component comprises a lens and said optical component displacement device is mechanically connected to said lens.

20. Apparatus as in claim 17 wherein said at least one optical component comprises a translucent wedge assembly and said optical component displacement device is mechanically connected to said translucent wedge assembly.

21. Apparatus as in claim 17 wherein said optical component displacement device comprises a piezoelectric apparatus.

22. Apparatus as in claim 17 wherein said optical component displacement device comprises a stepper motor.

23. Apparatus as in claim 17 wherein said optical component displacement device comprises a voice coil apparatus.

24. A photoelectric imaging apparatus for producing machine-readable data representative of imaged objects comprising:

(a) a photosensor assembly;

(b) at least one optical component located within a light path extending between an object which is to be imaged and said photosensor assembly, wherein said at least one optical component is pivotally moveable;

(c) an optical component displacement device mechanically connected to said at least one optical component; and (d) a signal processor assembly having a signal input portion connected to said photosensor assembly and having a signal output portion connected to said optical component displacement device.

25. Apparatus as in claim 24 wherein said at least one optical component comprises a mirror and said optical component displacement device is mechanically connected to said mirror.

26. Apparatus as in claim 24 wherein said at least one optical component comprises a color component separating filter section and said optical component displacement device is mechanically connected to said color component separating filter section.

27. Apparatus as in claim 24 wherein said optical component displacement device comprises a piezo electric apparatus.

28. Apparatus as in claim 24 wherein said optical component displacement device comprises a stepper motor.

29. Apparatus as in claim 24 wherein said optical component displacement device comprises a voice coil apparatus.

30. A photoelectric imaging apparatus for producing machine-readable data representative of imaged objects comprising:

(a) a photosensor assembly;

(b) a light path extending between an object which is to be imaged and said photosensor assembly;

(c) wherein said photosensor assembly is transversely movable with respect to said light path;

(d) a photosensor assembly displacement device mechanically connected to said photosensor assembly; and (e) a signal processor assembly having a signal input portion connected to said photosensor assembly and having a signal output portion connected to said photosensor assembly displacement device.

31. Apparatus as in claim 30 wherein said photosensor assembly displacement device comprises a piezo electric apparatus.

32. Apparatus as in claim 30 wherein said photosensor assembly displacement device comprises a stepper motor.

33. Apparatus as in claim 30 wherein said photosensor assembly displacement device comprises a voice coil apparatus.

* * * * *